United States Patent
Shekleton et al.

[11] Patent Number: 5,101,620
[45] Date of Patent: Apr. 7, 1992

[54] ANNULAR COMBUSTOR FOR A TURBINE ENGINE WITHOUT FILM COOLING

[75] Inventors: Jack R. Shekleton; Melvin K. Lafferty, both of San Diego, Calif.

[73] Assignee: Sundstrand Corporation, Rockford, Ill.

[21] Appl. No.: 453,687

[22] Filed: Dec. 20, 1989

Related U.S. Application Data

[63] Continuation-in-part of Ser. No. 291,056, Dec. 28, 1988.

[51] Int. Cl.⁵ .............................. F02C 3/05; F02C 7/18
[52] U.S. Cl. .................................. 60/39.36; 60/39.75; 60/760
[58] Field of Search ............... 60/34, 36, 755, 39.75, 60/39.83, 760, 737, 738

[56] References Cited

U.S. PATENT DOCUMENTS

| | | |
|---|---|---|
| 2,625,793 | 1/1953 | Mierley et al. |
| 2,658,338 | 11/1953 | Leduc |
| 2,709,893 | 6/1955 | Birmann |
| 2,721,445 | 10/1955 | Giliberty |
| 3,230,710 | 1/1966 | Van Ninwegen et al. |
| 3,321,912 | 5/1967 | Oprecht |
| 3,383,855 | 5/1968 | Freeman et al. |
| 3,390,521 | 7/1968 | Anley et al. |
| 3,490,747 | 1/1970 | De Corso et al. ................ 60/39.75 |
| 3,608,310 | 9/1971 | Vaught ................................ 60/752 |
| 3,613,360 | 10/1971 | Howes ................................ 60/39.36 |
| 3,623,318 | 11/1971 | Shank |
| 3,670,497 | 6/1972 | Sheldon ............................. 60/39.36 |
| 4,151,709 | 5/1979 | Melconran et al. .............. 60/755 |
| 4,739,621 | 4/1988 | Pettingill et al. ................. 60/39.83 |
| 4,761,947 | 8/1988 | Hennecke et al. |
| 4,949,545 | 8/1990 | Shekleton ......................... 60/39.36 |

Primary Examiner—Richard A. Bertsch
Assistant Examiner—Timothy S. Thorpe
Attorney, Agent, or Firm—Wood, Phillips, Mason, Beckenwald & VanSanten

[57] ABSTRACT

Problems with the cooling of a turbine nozzle (60) and a turbine wheel (20) of a gas turbine engine when the engine is uprated may be avoided or minimized by employing a combustor (36) that is free of any means for providing cooling air films on the interior walls thereof and which allows the entry of only stoichiometric quantities of air into the interior of the combustor (36) at predetermined locations along the entire axial length thereof. Consequently, the entirety of the combustor (36) is available for combustion. Cooling of the nozzle (60) and components of the engine downstream thereof is handled by the provision of an annular opening (96) immediately upstream of the leading edges (98) of the vanes (58) constituting the nozzle (60) along with apertures (102) in a front turbine shroud (30) and aligned with leading edges (98). Air from the engine compressor (18) is flowed through the apertures (102) and the opening (96).

12 Claims, 2 Drawing Sheets

ANNULAR COMBUSTOR FOR A TURBINE ENGINE WITHOUT FILM COOLING

CROSS-REFERENCE

This application is a Continuation-In-Part of the commonly assigned, co-pending application of Shekleton et al., Ser. No. 291,056, filed Dec. 28, 1988 and entitled "COOLING OF TURBINE NOZZLES" now allowed.

FIELD OF THE INVENTION

This invention relates to turbine engines, and more particularly, to a means by which the combustion flame zone of an annular combustor may be maximized to maximize power density.

BACKGROUND OF THE INVENTION

Thermal constraints are a typical limitation on the power that may be generated by air breathing gas turbine engines. Components such as the turbine nozzle and the vanes thereof as well as the turbine wheel and blades thereon cannot be subjected to gases of combustion at temperatures in excess of some predetermined temperature without either shortening the life of the engine or requiring resort to expensive, exotic materials which make the cost of manufacture of the engine uneconomical. Thus, for a gas turbine engine having a combustor of given size, the ultimate power output is not always so much limited by gas generating volume associated with combustion as by the ability of the design to allow operation without exceeding temperature limits at the turbine nozzle and at the turbine wheel.

Recognition of this factor suggests that a given turbine engine could be uprated by increasing the combustor volume power density which can be obtained by maximizing the combustion flame zone within a given combustor volume.

One limitation on the combustion flame zone size resides in the physical location of the combustor walls with respect to each other and the combustor volume they define. Conventionally, an increased flame zone is attained by spreading the walls to increase the volume of the combustor. This, however, increases the size of the engine and in essence, is a re-design of a whole new engine as opposed to an uprating of an existing one. The other constraint on flame zone size is limitations on the amount of the combustor volume that is available for combustion. Conventionally, the total interior volume of the combustor is not available for combustion for the reason that various devices are employed on the interior walls to generate film air cooling of such walls to prevent the combustor itself from overheating or for otherwise introducing dilution air. Clearly, combustion cannot occur in those areas where film air cooling or the like is intended to occur without damaging the combustor and so the potential combustion flame zone for such a combustor is reduced by the volume devoted to the provision of means for providing film air cooling or the like.

The present invention is directed to recovering that part of the volume of a combustor heretofore used for film air cooling and utilizing it to increase the combustion flame zone for that combustor. That in turn will increase the power density of the combustor which in turn will allow the gas turbine to be run with a greater output, that is, to be uprated.

SUMMARY OF THE INVENTION

It is the principal object of the invention to provide a new and improved gas turbine engine More specifically, it is an object of the invention to provide a gas turbine engine wherein the interior volume of the combustor is entirely devoted to the support of combustion to thereby provide an engine capable of developing greater power than an otherwise substantially identical gas turbine engine utilizing a conventional combustor.

An exemplary embodiment of the invention achieves the foregoing objects in a structure including a rotary compressor, a turbine wheel coupled to the compressor to drive the same, and an annular nozzle in proximity to the turbine wheel. The nozzle has a plurality of vanes disposed to direct gases of combustion at the turbine wheel. The vanes having leading edges remote from the turbine wheel and trailing edges adjacent the turbine wheel. An annular combustor is provided and has a radially outer wall, a radially inner wall spaced therefrom, and a radially extending wall interconnecting the inner and outer walls at a location remote from the nozzle. The inner and outer walls, at a location remote from the radially extending wall define an outlet throat which opens to the leading edges of the vanes. Means are provided for injecting fuel into the combustor and there are also provided a plurality of axially spaced rows of tangentially directed passages formed in the outer wall and in fluid communication with the compressor for introducing combustion air into the combustor. The passages are sized to provide substantially only combustion air into the combustor to the substantial exclusion of dilution air. The combustor is otherwise free of any inlets in fluid communication with the compressor. Finally, means are provided at the throat and just upstream of the leading edges of the vanes which are in fluid communication with the compressor for introducing substantially all dilution air thereat so that the combustion flame zone of the combustor is maximized. This in turn allows increasing of the power density and an uprating of the output of the gas turbine engine In one embodiment, the combustor is contained within a case which in turn is in fluid communication with the compressor. The inner wall of the combustor is spaced radially outward of a part of the case so that dilution air may pass along the inner wall of the combustor. The introducing means includes an annular opening substantially at the leading edges of the nozzle vanes which extends to the case between the aforementioned part and the inner wall of the combustor.

In a highly preferred embodiment, the turbine wheel is a radial turbine wheel and includes an annular, rear turbine shroud adjacent the turbine wheel and inwardly of the inner wall at the area of the throat. The annular opening is defined by the inner wall and a radially outer part of the rear turbine shroud.

According to another facet of the invention, there is contemplated a wall interposed between the compressor and the combustor and the throat thereof. The wall mounts the end of each of the nozzle vanes that is remote from the combustor. The introducing means comprises a series of apertures in the interposed wall and each is aligned with the leading edge of a corresponding vane in close proximity thereto. The apertures are in fluid communication with the compressor and thus provide individual streams of cooling air for the associated vanes.

In a highly preferred embodiment of the invention, the compressor includes a vaned diffuser at the interposed wall, and the side thereof opposite the nozzle, also mounts the vaned diffuser.

The invention contemplates in an optimal embodiment that air flow be through the aforementioned annular opening as well as through the apertures in the wall.

In a highly preferred embodiment, the passages are in the forms of tubes and one of the rows is closely adjacent to the radially extending wall of the combustor. Another of the rows is closely adjacent to the throat. Because all of the rows are necessary to provide combustion air, complete combustion of fuel does not occur until the throat is reached thereby maximizing the volume of the combustor that is utilized to support combustion.

Other objects and advantages will become apparent from the following specification taken in connection with the accompanying drawings.

DESCRIPTION OF THE PREFERRED EMBODIMENT

Figure 1:
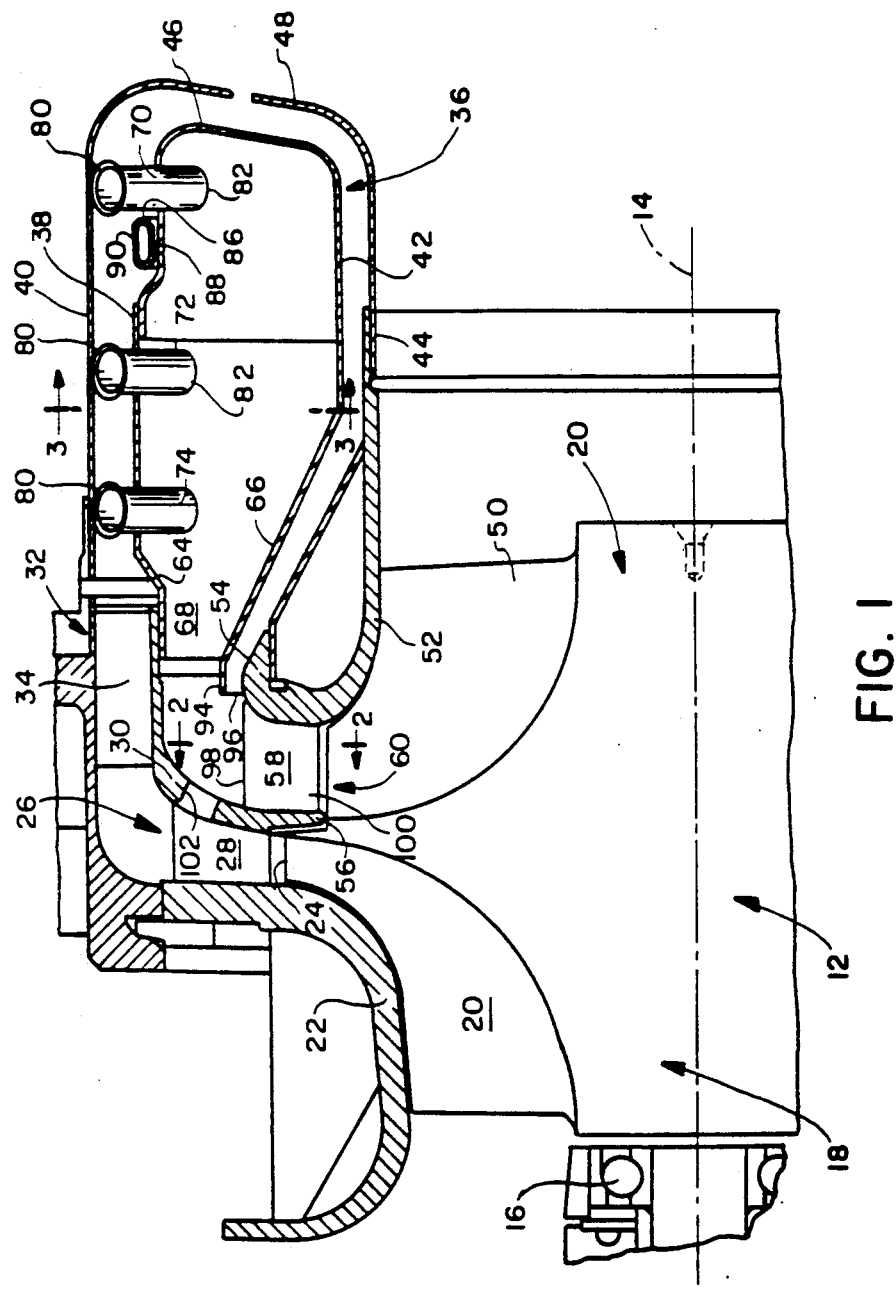
FIG. 1 is a fragmentary, sectional view of a gas turbine engine made according to the invention.

An exemplary embodiment of a gas turbine engine made according to the invention is illustrated in the drawings and will be described herein as a radial turbine. However, while the invention may be employed with the greatest efficacy in a radial turbine, it is not limited thereto but may be used in axial turbines as well.

Referring to FIG. 1, the gas turbine engine of the invention is seen to include a so-called monorotor, generally designated 12, mounted for rotation about an axis 14 by means of bearings fragmentarily illustrated at 16. The invention need not, however, be restricted to turbines having monorotors.

The monorotor 12 includes a rotary compressor section, generally designated 18 and a turbine wheel section, generally designated 20. Since the two are formed on a single rotor, it will be appreciated by those skilled in the art that the rotary compressor 18 is coupled to the turbine wheel 20 for rotation therewith.

The compressor 18 includes a series of blades 20 that rotate in close proximity to a fixed compressor shroud 22 and discharge at their radially outer ends 24 into a conventional vaned diffuser, generally designated 26, made up of a plurality of vanes 28, only one of which is shown. The vanes 28 are mounted to and extend between the compressor shroud 22 and a front turbine shroud 30.

Compressed air exiting the diffuser 26 is turned to flow in the axial direction by a case, generally designated 32 which may optionally include deswirler vanes 34. The case 32 is annular about the axis 14 and contains an annular combustor, generally designated 36. The combustor 36 includes a radially outer wall 38 which is located radially inwardly of a wall 40 of the case 32; a radially inner wall 42 which is radially outward of a wall 44 of the case 32 and a radially extending wall 46 axially spaced from a radially extending wall 48 from the case 32. As a consequence, the spaces between the foregoing walls are in fluid communication with each other and define a compressed air plenum in fluid communication with the compressor 20.

The turbine wheel 20 includes a plurality of turbine blades 50 which are mounted for rotation in close proximity to a rear turbine shroud 52 as is well known. The radially outer end 54 of the rear turbine shroud 52 is axially spaced from the radially inner end 56 of the front turbine shroud 30 and a plurality of vanes 58 defining an annular turbine nozzle, generally designated 60, extend therebetween. The vanes 60 receive hot gases of combustion from the combustor 36 and direct them against the blades 50 to drive the turbine wheel 20 as is well known.

The radially outer and inner walls 38 and 42 respectively of the combustor 36, at a location in close proximity to the nozzle 60 include converging sections 64 and 66 respectively which define a narrowing throat 68. The throat 68 serves as an outlet from the combustor 36 and is just upstream of the nozzle 60.

Figure 3:
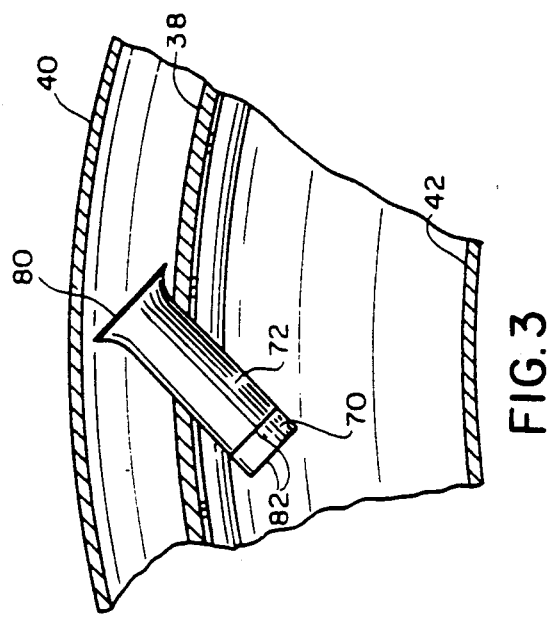
FIG. 3 is a fragmentary, sectional view taken approximately along the line 3—3 in FIG. 1.

Inlets to the combustor 36 consist of three axially spaced rows of circumferentially spaced tubes 70, 72 and 74. The tubes in each of the three rows occupy a common plane that is transverse to the rotational axis 14 of the rotor 12 and will typically be equally angularly spaced. As best seen in FIG. 3, each of the tubes is mounted in the radially outer wall 38 of the combustor 36 and is directed circumferentially or tangentially at the space between the inner wall 42 and the outer wall 38. The radially outer ends 80 of each of the tubes 70, 72 and 74 are flared and open to the space between the combustor 36 and the case 32 to receive compressed air from the compressor 20 and direct the same to the interior of the combustor 36. The interior ends 82 of the tubes 70, 72 and 74 are, of course open for this purpose.

It is to be particularly noted that the row of tubes 70 is closely adjacent a radially extending wall 46 of the combustor while the row of tubes 74 is closely adjacent the throat 68 of the combustor 36.

As seen in FIG. 1, each of the tubes 70 includes an opening 86 in a side wall thereof adjacent an annular, flattened tube 88 received in the space between the walls 38 and 40. The flattened tube 88 is connected to the fuel supply for the turbine and includes openings 90 aligned with each of the openings 86 and thus serve as a simple means for injecting fuel into the interior of each of the tubes 70 where it may be air blast atomized.

An important feature of the present invention is the fact that the compressed air passages to the interior of the combustor 36 defined by the tubes 70, 72 and 74 are sized so that air entering the combustor 36 is only in sufficient quantity to stoichiometrically combust fuel injected into the combustor 36 and not to serve, in any appreciable way, as dilution air as would be conventional. It is also significant to note that except for the tubes 70, 72 and 74, the walls 38, 42 and 46 of the combustors 36 are imperforate which is to say that they are free of any openings that are in fluid communication with the compressor 20. Consequently, the combustor 36 may be characterized as completely lacking any means for the introduction of dilution air in any appreciable measure to the interior thereof and as lacking any means for the generation of cooling air films or the like on the interior of the various walls making up the combustor 36.

Instead, the combustor 36 is cooled by flowing air from the compressor 20 through the space between the case 32 and the combustor 36 about each of the combustor walls 38, 46 and 42 in that sequence. In this respect, it will be observed that the end 94 of the radially inner wall section 66 defining the throat 68 is spaced radially outward of the radially outer end 54 of the rear turbine shroud 52. This in turn defines an annular opening 96 to the space between the combustor 36 and the case 32 through which swirling and cooling air, after having cooled the combustor 36, is discharged into the stream of gases flowing to the turbine wheel 50. The discharge opening 96 is located immediately adjacent and just upstream of the leading edges 98 of the vanes 58 whose trailing edges 100 are, in turn, immediately adjacent the blades 50. Thus, at least that part of each of the vanes 58 extending from the rear engine shroud 54, by reason of the proximity to the discharge opening 96 for dilution air, is cooled to a desired operating temperature. As the dilution is occurring upstream of the turbine wheel 20, the latter will not run hot either.

Figure 2:
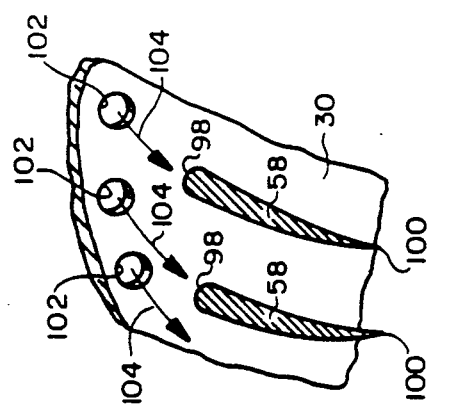
FIG. 2 is a fragmentary, sectional view taken approximately along the line 2—2 in FIG. 1.

To provide cooling for that part of the leading edges 98 an the vanes 58 adjacent and mounted to the front turbine shroud 30, the same includes a plurality of apertures or openings 102 that are just upstream of the leading edges 98 of the vanes 58. As shown in FIG. 2, the apertures 102 are aligned with the leading edges 98 and also open to the interior of the vaned diffuser 26 as seen in FIG. 1. Thus, compressed air from the compressor 20 may flow through the apertures 102 and in the path of arrows 104 (FIG. 2) to impinge upon the leading edges 98 of the vanes 58 to provide cooling of the same in the vicinity of the front turbine shroud 30.

The alignment of the apertures 102 with leading edges 98 should be such as to take into account the swirling of the gases at the locations involved. The tangential or circumferential disposition of the tubes 70, 72 and 74 will result in products of combustion swirling circumferentially as they emerge from the throat 68 of the combustor 36 and, as is well known, swirl wil' be imparted to compressed air leaving the tips 44 of the compressor blades 20.

Substantially all of the dilution air required for cooling of the nozzle 60 and the turbine wheel 20 is introduced into the stream of hot gases down stream of the throat 68 and immediately upstream of the leading edges 98 of the nozzle via the annular opening 96 and the apertures 102. This provides for adequate cooling of the components without cutting into the effective volume of the combustor 36 that is available as a combustion flame zone.

Furthermore, since the passages defined by the tubes 70, 72 and 74 are configured to provide substantially only the combustion air that is required for stoichiometric combustion, it follows that combustion will not be complete until the burning gases mix with the last of the air being introduced, which introduction occurred through the tubes 74 immediately adjacent the throat 68. And because the tubes 70 are closely adjacent the radially extending wall 46, this means that the full axial length of the combustor 36 is available for use as a combustion flame zone. As a result, the combustion flame zone within the combustor 36 is maximized allowing a greater amount of fuel to be burned therein per unit of time without creating cooling problems. As a consequence, the power output of the gas turbine may be increased and the turbine itself uprated.

We claim:

1. A gas turbine engine comprising:
   a rotary compressor;
   a turbine wheel coupled to said compressor to drive the same;
   an annular nozzle in proximity to said turbine wheel and having a plurality of vanes disposed to direct gases of combustion at said turbine wheel, said vanes having leading edges remote from said turbine wheel and trailing edges adjacent said turbine wheel;
   an annular combustor having a radially outer wall, a radially inner wall spaced therefrom and a radially extending wall interconnecting said inner and outer walls remote from said nozzle, said inner and outer walls, at a location remote from said radially extending wall defining an outlet throat opening to the leading edges of said vanes;
   means for injecting fuel into the combustor;
   a plurality of axially spaced rows of tangentially directed passages formed in said outer wall and in fluid communication with said compressor for introducing combustion air into the combustor, said passages being sized to provide substantially only combustion air to the substantial exclusion of dilution air into said combustor and in a quantity to substantially stoichiometrically combust fuel injected into said combustor by said fuel injecting means, and said combustor, between said throat and said radially extending wall, otherwise being free of any inlets in fluid communication with said compressor; and
   means at said throat and just upstream of said leading edges and in fluid communication with said compressor for introducing substantially all dilution air thereat toward said nozzle and away from said combustor whereby the combustion flame zone of said combustor is maximized.

2. The gas turbine engine of claim 1 wherein said combustor is contained within a case which in turn is in fluid communication with said compressor, said inner wall being spaced radially outward of a part of said case so that dilution air may pass between said inner wall and said case, said introducing means including an annular opening substantially at said leading edges and extending to said case between said part and said inner wall.

3. The gas turbine engine of claim 2 wherein said turbine wheel is a radial turbine wheel and further including an annular rear turbine shroud adjacent said turbine wheel and inwardly of said inner wall at said throat, said annular opening being defined by said inner wall and a radially outer part of said rear turbine shroud.

4. The gas turbine engine of claim 1 further including a wall interposed between said compressor and said combustor and the throat thereof and mounting the end of each of said vanes that is remote from said combustor, and said introducing means comprises a series of apertures in said interposed wall and each aligned with the leading edge of a corresponding vane in close proximity thereto, said apertures being in fluid communication with said compressor.

5. The gas turbine engine of claim 4 wherein said compressor includes a vaned diffuser and said interposed wall, on the side thereof opposite said nozzle, also mounts said vaned diffuser.

6. A gas turbine engine comprising:
   a rotary compressor;
   a turbine wheel coupled to said compressor to drive the same;
   an annular nozzle in proximity to said turbine wheel and having a plurality of vanes disposed to direct gases of combustion at said turbine wheel, said vanes having leading edges remote from said turbine wheel and trailing edges adjacent said turbine wheel;

an annular combustor having a radially outer wall, a radially inner wall spaced therefrom and a radially extending wall interconnecting said inner and outer walls remote from said nozzle, said inner and outer walls, at a location remote from said radially extending wall converging to define an outlet throat opening to the leading edges of said vanes;

means for injecting fuel into the combustor;

a plurality of axially spaced, circumferential rows of tangentially directed passages formed in said outer wall and in fluid communication with said compressor for introducing combustion air into the combustor, said passages being sized to provide substantially only combustion air to the substantial exclusion of dilution air to said combustor and in a quantity to substantially stoichiometrically combust fuel injected into said combustor by said fuel injecting means, and said combustor otherwise being free of any inlets in fluid communication with said compressor;

first means in fluid communication with said compressor and defining a fluid flow path about said combustor and having a discharge opening immediately upstream of said leading edges, said first means introducing dilution air toward said leading edges and away from said combustor; and second means in fluid communication with said compressor and having at least one discharge opening immediately upstream of said leading edges and on the side thereof opposite said first means.

7. The gas turbine engine of claim 6 wherein one of said rows is axially adjacent said radically extending wall and another of said rows is closed adjacent said throat.

8. The gas turbine engine of claim 7 wherein there are three said rows, including an intermediate row between said one row and said another row; and said fuel injecting means injects fuel through the passages in said one row.

9. The gas turbine engine of claim 8 wherein said passages are defined by tubes.

10. The gas turbine engine comprising:

a rotary compressor;

a turbine wheel coupled to said compressor to drive the same;

an annular nozzle in proximity to said turbine wheel and having a plurality of vanes disposed to direct gases of combustion at said turbine wheel, said vanes having leading edges remote from said turbine wheel and trailing edges adjacent said turbine wheel;

an annular combustor having a radially outer wall, a radially inner wall spaced therefrom and a radially extending wall interconnecting said inner and outer walls remote from said nozzle, said inner and outer walls, at a location remote from said radially extending wall defining an outlet throat opening to the leading edges of said vanes;

means for injecting fuel into the combustor;

a plurality of axially spaced, circumferential rows of tangentially directed tubes mounted in said outer wall and in fluid communication with said compressor for introducing combustion air into the combustor, said tubes being sized to provide substantially only combustion air to the substantial exclusion of dilution air into said combustor and in a quantity to substantially stoichiometrically combust fuel injected into said combustor by said fuel injecting means, and said combustor otherwise being free of any inlets in fluid communication with said compressor, one of said rows being closely adjacent said radial extending wall and another of said rows being closely adjacent said throat; and means at said throat and just upstream of said leading edges and in fluid communication with said compressor for introducing substantially all dilution air thereat toward said nozzle and away from said combustor whereby the combustion flame zone of said combustor is maximized.

11. The gas turbine engine of claim 10 wherein said combustor is contained within a case which in turn is in fluid communication with said compressor, said inner wall being spaced radially outward of a part of said case so that dilution air may pass between said inner wall and said case, said introducing means including an annular opening substantially at said leading edges and extending to said case between said part and said inner wall; and further including a wall interposed between said compressor and said combustor and the throat thereof, said interposed wall mounting the end of each of said vanes that is remote from said combustor, and said introducing means further comprising a series of apertures in said interposed wall and each aligned with the leading edge of a corresponding vane in close proximity thereto, said apertures being in fluid communication with said compressor.

12. The gas turbine engine of claim 11 wherein said turbine wheel is a radial turbine wheel and further including an annular rear turbine shroud adjacent said turbine wheel and inwardly of said inner wall at said throat, said annular opening being defined by said inner wall and a radially outer part of said rear turbine shroud, and wherein said compressor includes a vaned diffuser and said interposed wall, on the side thereof opposite said nozzle, also mounts said vaned diffuser.

* * * * *